United States Patent [19]

Maruko et al.

[11] 4,341,973
[45] Jul. 27, 1982

[54] ARMATURE IN ELECTRICAL ROTARY MACHINE

[75] Inventors: Yutaka Maruko, Iruma; Susumu Sako, Kawagoe; Tamotu Kobayashi, Hidaka, all of Japan

[73] Assignee: Kabushiki Kaisha Yaskawa Denki Seisakusho, Kitakyushu, Japan

[21] Appl. No.: 169,586

[22] Filed: Jul. 17, 1980

[30] Foreign Application Priority Data

Jul. 27, 1979 [JP] Japan .................. 54-104561[U]

[51] Int. Cl.³ .................................. H02K 1/22
[52] U.S. Cl. .......................... 310/268; 310/206; 310/237
[58] Field of Search .......... 310/68 R, 237, 268, 310/198, 199, 200, 201, 202, 203, 204, 205, 206, 207, DIG. 6

[56] References Cited

U.S. PATENT DOCUMENTS

| 3,109,114 | 10/1963 | Henry-Baudot | 310/268 |
| 3,223,868 | 12/1965 | Henry-Baudot | 310/268 |
| 3,292,024 | 12/1966 | Kober | 310/268 |
| 3,450,909 | 6/1969 | Burr | 310/268 |

FOREIGN PATENT DOCUMENTS 1249980  9/1967  Fed. Rep. of Germany ...... 310/268

Primary Examiner—J. D. Miller
Assistant Examiner—D. L. Rebsch
Attorney, Agent, or Firm—Ladas & Parry

[57] ABSTRACT

In the armature of an electrical rotary machine, each of the half coils printed on both surfaces of an insulating disc is made up of a radially extended linear conductor and inner and outer sloped conductors connected to the ends of the linear conductors, the half coils being connected to one another to form complete coils wound around the disc, and the inner conductor is extended along an involute line with a circle as its base circle, which is smaller in diameter than the circle which is formed by the inner ends of the winding conductors.

3 Claims, 3 Drawing Figures

ARMATURE IN ELECTRICAL ROTARY MACHINE

BACKGROUND OF THE INVENTION

This invention relates to an improvement of an armature which comprises a number of winding conductors, or half coils, which are printed on both surfaces of an insulating disc by etching or punching, the half coils on both surfaces of the disc being electrically connected to one another to form complete coils.

A typical conventional armature of this type is as shown in FIG. 1. Permanent magnets or magnetic poles 2 and magnetic members 3 are fixedly secured to a frame 1. A rotor 7 mounted on a rotary shaft 8 is provided in the space between the magnetic poles 2 and the magnetic members 3. The rotor 7 has an insulating disc 4 on both surfaces of which conductors 5 and 6 are printed. Current is applied to the conductors 5 and 6 through brushes 9.

Each of the conductors 5 and 6, as shown in FIG. 2, is made up of a radially extended linear conductor 11, and an inner sloped conductor 12 and an outer sloped conductor 13 which are extended from the ends of the linear conductor 11 towards the inner circumference and the outer circumference of the disc 4, respectively. In this armature, the width of each of the sloped conductors, especially the width W of the inner sloped conductor 12 is small, and therefore the current density therein is high.

In order to overcome this difficulty, a method has been proposed in the art in which each of the sloped conductors 12 and 13 is formed along an involute line ($A_1$ or $A_2$ in FIG. 3) with a circle R1 as its base circle, which is formed by the inner ends of the winding conductors, whereby the conductors are made uniform in width. According to the method, the effective conductor width is increased, the conductors are uniform in width, and accordingly the current capacity is increased, because the conductors are formed along the involute line of the circle.

On the other hand, recently it has been demanded especially for a small electric motor to decrease the armature current and yet to increase the torque constant. In order to satisfy this demand, it is necessary to effectively utilize the magnetic flux of the permanent magnets, i.e. to increase the magnetic flux effective area. However, the aforementioned method in which the sloped conductors are formed along the involute line with the circle formed by the inner ends of the winding conductors as its base circle is disadvantageous in that the magnetic flux effective area is defined by the inside diameter R1 and the outside diameter R2 of the winding assembly.

SUMMARY OF THE INVENTION

Accordingly, an object of this invention is to provide an armature in an electrical rotary machine in which all of the above-described difficulties accompanying a conventional armature are overcome.

Another object of the invention is to provide an armature in an electrical rotary machine in which the magnetic flux effective area of the coil is increased and the torque constant is also increased.

The nature, principle and utility of the invention will become more apparent from the following detailed description when read in conjunction with the accompanying drawings.

DETAILED DESCRIPTION OF THE INVENTION

Figure 1:
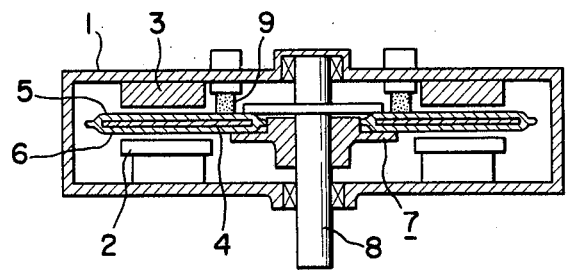
FIG. 1 is a sectional view showing an electrical rotary machine to which the technical concept of this invention is applicable.
Figure 2:
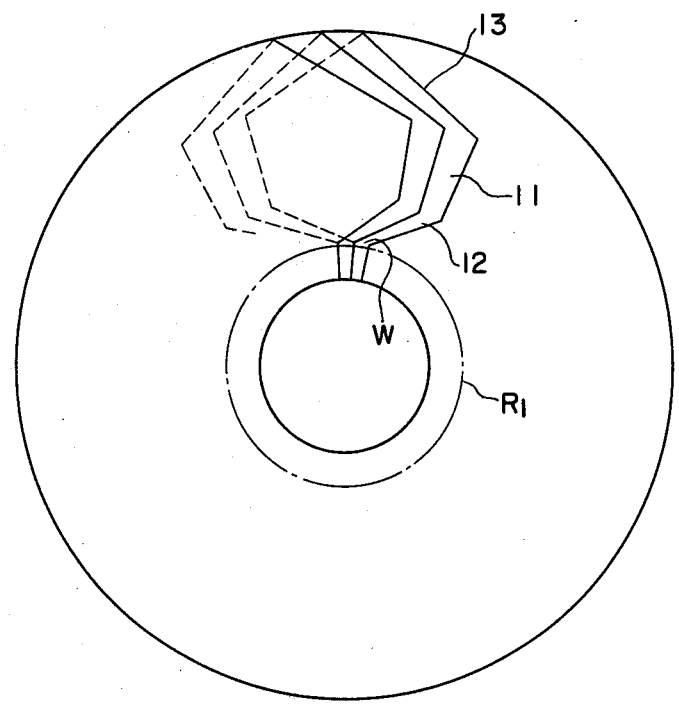
FIG. 2 is a plan view of a conventional armature, showing only a part of the winding conductors.
Figure 3:
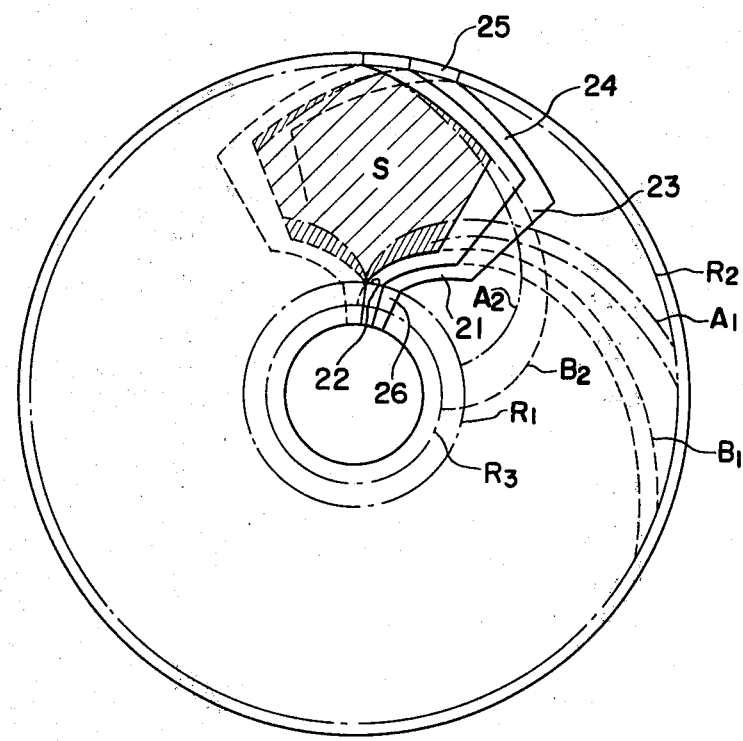
FIG. 3 is a plan view of an armature according to the invention, showing only a part of the winding conductors and indicating the difference between the conventional winding conductors and the winding conductors arranged according to the invention.

In one preferred example of an armature in an electrical rotary machine according to this invention, as shown in FIG. 3, an inner sloped conductor 21 of each half coil on the front side of the armature extends along an involute $B_1$ of a circle R3 employed as a base circle, which is smaller than a circle R1 formed by the inner ends 22 of the half coils, and the conductor 21 is connected to a linear conductor 23 at a predetermined angular position corresponding to the number of poles. An outer sloped conductor 24 extends from the outer end of the linear conductor 23 to the circumference R2 of the half coils, along another involute $B_2$ of base circle R3 opposite in direction to involute $B_1$. The outer sloped conductor 24 has a connecting terminal 25 at its outer end, which is connected in any suitable manner, such as by welding, to a corresponding part of a complementary half coil which is provided on the rear side of the armature.

The inner ends of the inner sloped conductors 21 are extended radially inwardly from circle R1 to form commutator elements 26, and each element 26 is coupled, as by welding to a like element of the corresponding complementary half coil on the rear side of the armature.

As is apparent from the above description, the inner sloped conductor 21 of each winding conductor is formed along an involute $B_1$ of base circle R3, which is smaller than the circle R1 formed by the inner ends 22 of the half coils, and therefore its effective conductor width is decreased and its resistance is increased relative to the width and resistance of any inner sloped conductor that may be formed along an involute $A_1$ of circle R1 employed as a base circle. However, the angles of inclination of the sloped conductors 21 and 24 can advantageously be selected suitably, and therefore the effective area S of magnetic flux of the coil can be increased as much as the region hatched, and the torque constant (i.e. the torque per current) can be increased. Should a smaller increase of the effective area S of magnetic flux of the coil be desired, the coil would be designed to make the angles of inclination of its sloped conductors 21 and 24 greater by forming the conductors along involutes of a base circle having a diameter greater than that of circle R3 and less than that of circle R1. By the same token, a larger increase of the effective area S would result from designing the coil to reduce the angles of inclination of its sloped conductors 21 and 24 by forming the conductors along involutes of a base circle having a diameter smaller than that of circle R3. Thus, the smaller the diameter of the base circle, the larger will be the effective area S.

The outer sloped conductor 24 is formed along another involute line $B_2$ with the circle $R_3$ as its base circle. However, in the case where it is not required to increase the effective area of magnetic flux of the outer sloped conductor, the outer sloped conductor may be formed, for instance, along the involute line $A_2$ with the circle $R_1$ as its base circle.

What is claimed is:

1. An armature in an electrical rotary machine, which comprises a plurality of half coils printed on both surfaces of an insulating disc, each half coil being constituted by a radially extended linear conductor and an inner sloped conductor and an outer sloped conductor which are extended from both ends of said linear conductor towards the inner circumference and outer circumference of said disc, respectively, said half coils on both surfaces of said disc being connected to one another at the inner and outer ends thereof by radially extending connecting portions; wherein
   each of said inner sloped conductors is extended along an involute line with a first circle as a base circle, which is smaller than a second circle formed by the inner ends of the half coils.

2. An armature as claimed in claim 1, in which each of said outer sloped conductors is extended along an involute line with a circle as a base circle, which is used to form said inner sloped conductor.

3. An armature as claimed in claim 1, in which each of said outer sloped conductors is extended along an involute line with a circle as a base circle, which is different from said first circle employed to form said inner sloped conductor.

* * * * *